(12) United States Patent
Xu et al.

(10) Patent No.: US 8,971,579 B2
(45) Date of Patent: Mar. 3, 2015

(54) WINDSHIELD LOCALIZATION FOR OCCUPANCY DETECTION

(71) Applicant: Xerox Corporation, Norwalk, CT (US)

(72) Inventors: Beilei Xu, Penfield, NY (US); Peter Paul, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 112 days.

(21) Appl. No.: 13/859,047

(22) Filed: Apr. 9, 2013

(65) Prior Publication Data

US 2014/0301597 A1 Oct. 9, 2014

(51) Int. Cl.
G06K 9/00 (2006.01)
G06K 9/36 (2006.01)
G06K 9/52 (2006.01)

(52) U.S. Cl.
CPC .................................. G06K 9/00832 (2013.01)
USPC ............................. 382/103; 382/104; 382/173

(58) Field of Classification Search
None
See application file for complete search history.

(56) References Cited

U.S. PATENT DOCUMENTS

| | | | |
|---|---|---|---|
| 2008/0175438 A1* | 7/2008 | Alves | 382/105 |
| 2009/0309974 A1 | 12/2009 | Agrawal et al. | |
| 2010/0322471 A1 | 12/2010 | Treado et al. | |
| 2011/0164789 A1* | 7/2011 | Robert | 382/104 |
| 2011/0293141 A1* | 12/2011 | Robert et al. | 382/103 |
| 2012/0039508 A1 | 2/2012 | Cao et al. | |
| 2012/0212617 A1 | 8/2012 | Wang et al. | |
| 2012/0219222 A1 | 8/2012 | Ferman et al. | |

* cited by examiner

Primary Examiner — Michael A Newman
Assistant Examiner — Soo Shin
(74) Attorney, Agent, or Firm — Luis M. Ortiz; Kermit D. Lopez; Ortiz & Lopez, PLLC

(57) ABSTRACT

A system and method to capture an image of an oncoming target vehicle and localize the windshield of the target vehicle. Upon capturing an image, it is then analyzed to detect certain features of the target vehicle. Based on geometrical relationships of the detected features, the area of the image containing the windshield of the vehicle can then be identified and localized for downstream processing.

16 Claims, 5 Drawing Sheets

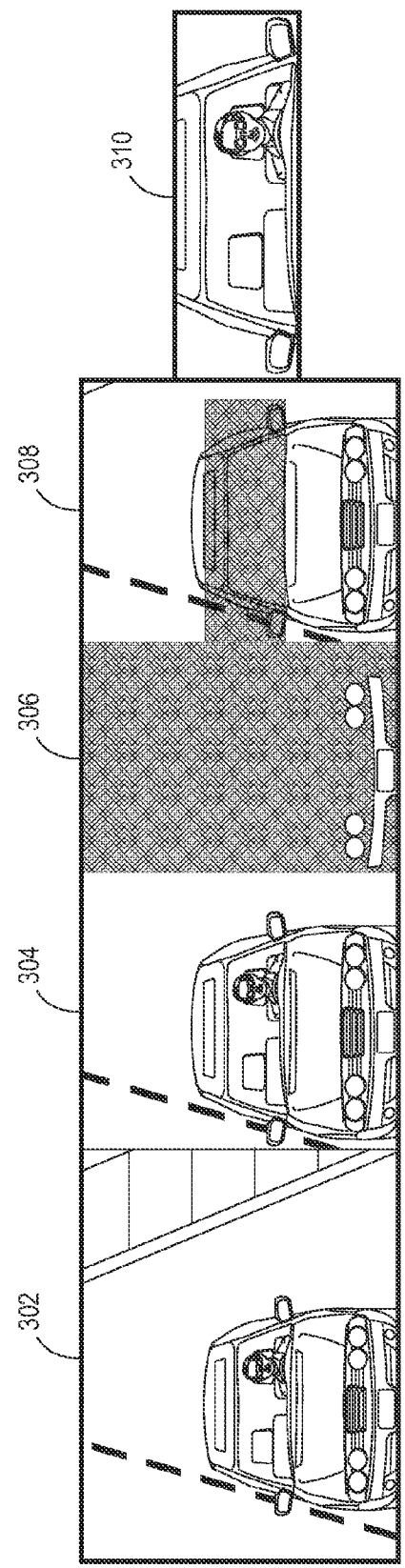

WINDSHIELD LOCALIZATION FOR OCCUPANCY DETECTION

FIELD OF THE INVENTION

Embodiments are related to image analysis. Embodiments are further related to localization of a target object. Embodiments are also related to detection of vehicle occupancy for managed lane enforcement.

BACKGROUND

Managed Lanes describe both High Occupancy Vehicle (HOV) lanes as well as High Occupancy Tolling (HOT) lanes. To enforce the rules of these lanes, current practice requires dispatching law enforcement officers at the side of HOV/HOT lanes to visually examine passing vehicles. This method is expensive, difficult, and ultimately ineffective as few violators are actually caught and ticketed. An alternate method of monitoring managed lanes is image-based automatic enforcement which requires identification and classification of image features (e.g., faces, seats, seat belts, etc.) behind a windshield that are visible to the camera to distinguish a driver+passenger configuration vs. a driver only configuration. This method is highly dependent upon camera placement and timing to obtain a clear image of the interior of a vehicle. In most locations, it is not possible to aim the camera such that its field of view is tightly focused on the windshield of all oncoming cars. The location of the windshield in captured images will vary from car to car depending on driver behavior and vehicle design, thus reducing the effectiveness of such an image based approached. As such, a need exists for accurate localization of the windshield region from a captured image to efficiently and effectively identify violators in managed lanes.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

The embodiments disclosed herein relate to feature-based image analysis for localization of a windshield within an image. A target vehicle within a captured image can be identified and localized based on prior knowledge of geometric and spatial relationships. Objects of interest on the target vehicle can then be identified and utilizing a priori knowledge of the relative geometric relationships between the identified objects, the area of the image containing the windshield of the target vehicle can be identified and localized for downstream processing to detect vehicles in violation of HOV/HOT lane requirements or other violations, such as seat belt requirements.

DESCRIPTION OF THE FIGURES

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

FIG. 2 illustrates a block diagram of a data-processing system that embodiments may be adapted for use with;

FIG. 5 illustrates resultant images from the feature-based image analysis method 200 and system 300.

DETAILED DESCRIPTION

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete and will fully convey the scope of the invention to those skilled in the art. Unnecessary detail of known functions and operations may be omitted from the current description so as not to obscure the present invention. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
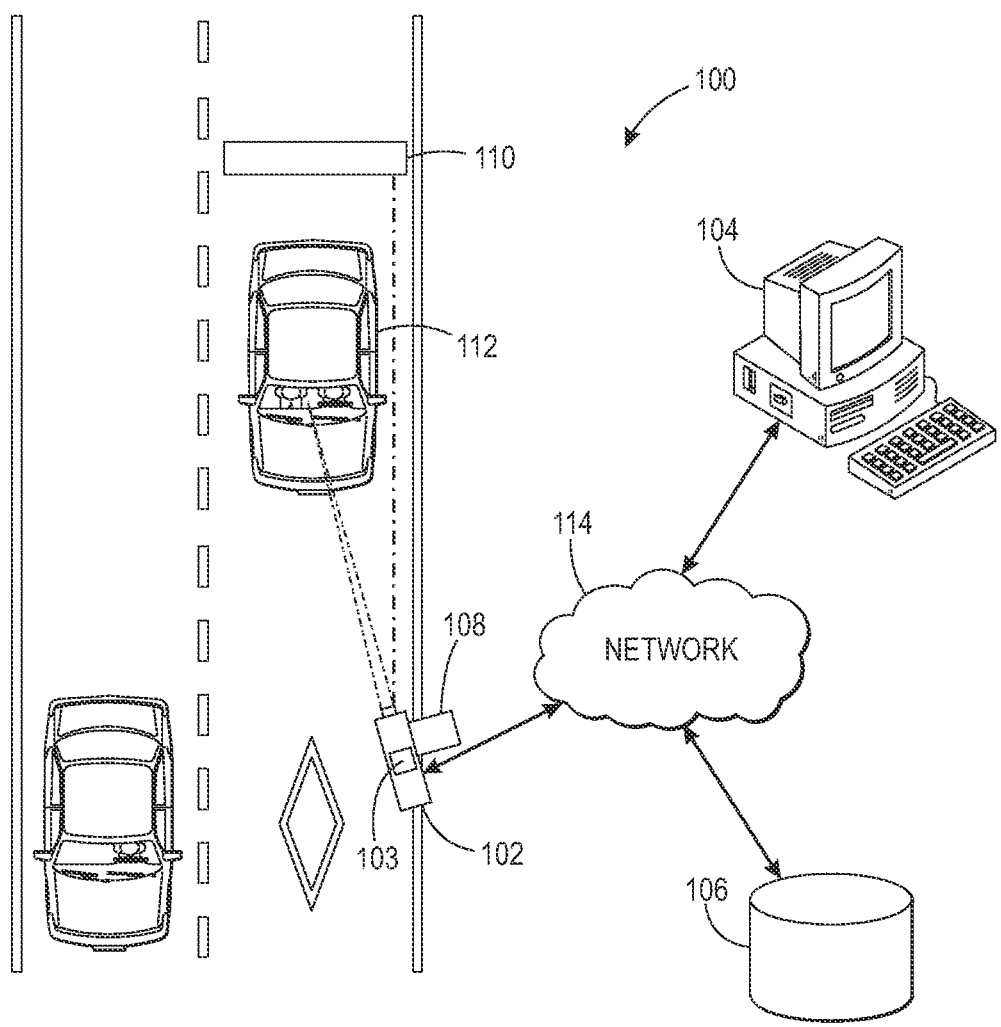
FIG. 1 illustrates a system 100 for performing image-based feature recognition.

FIG. 1 illustrates a system 100 for performing image-based feature recognition. The system 100 consists of at least an image capture device 102 being operably connected to a data processing device 104 capable of executing modules and being operably connected to a database 106 via a network 114, or other wired or wireless means of connection. The image capture device 102 may be a camera, video camera, infrared camera or any other device capable of capturing an image of a still or moving target. The image capture device 102 can include an image capture device sensor 103. An illumination source 108 may also be provided as a component of the image capture device 102 or as a separate device. The illumination source 108 is configured to provide illumination of a target or target area. In an embodiment of the system 100, the illumination source 108 is configured to provide near infrared (NIR) illumination of a target vehicle 112 so as not to be obtrusive or distracting to the driver of the vehicle. The camera and illumination source can be mounted on an overhead gantry or side of the road. The system 100 may also include a target trigger device 110 operably connected to the image capture device 102 and/or data processing system. The target trigger device 110 indicates when a target is within a certain area or range. The target trigger device 110 may be implemented as an inductive loop detector embedded in a roadway, a magnetometer detector, a video detector, a laser based detector, a microwave detector, or any other device configured to detect a specified target entering a certain area. The system 100 functions by first capturing an image of a target vehicle utilizing the image capture device 102 upon receiving notification from the target trigger device 110 that the target vehicle is within a certain area. The image is analyzed utilizing the data processing system 104 to detect certain features of the vehicle in order to then locate the area of the image containing the windshield of the vehicle for downstream processing. The system 100 may be configured to allow the entire process of image capture and analysis to be performed on-site in real-time or to transmit the captured images to a remote location for off-site analysis.

Figure 2:
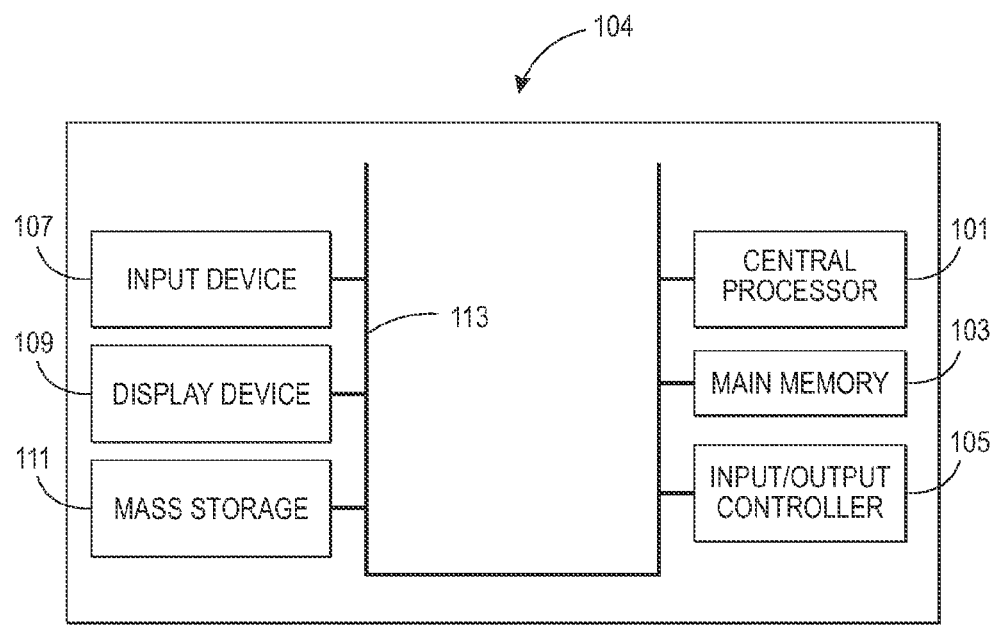

FIG. 2 illustrates a block diagram of a data-processing system 104 that embodiments may be adapted for use with. The system 104 comprises a central processor 101, a main memory 103, an input/output controller 105, an input device 107 (e.g., a mouse, track ball, keyboard, touch screen, etc.), a display device 109, and a mass storage 111. As illustrated, the various components of the data-processing system 104 communicate through a system bus 113 or similar architecture. Embodiments of such a data-processing system may include personal computers, laptops, netbooks, tablets, cellular phones or any device having data-processing and networking capabilities. It should be appreciated that FIG. 2 is only exemplary and is not intended to assert or imply any limitation with regard to the environments in which aspects or embodiments can be implemented. Many modifications to the depicted environments can be made without departing from the spirit and scope of the disclosed embodiments.

The embodiments described herein can be implemented in the context of a host operating system on the data processing system 104 and one or more modules. Such modules may constitute hardware modules such as, for example, electronic components of a computer system. Such modules may also constitute software modules. In the computer programming arts, a software "module" can be typically implemented as a collection of routines and data structures that performs particular tasks or implements a particular abstract data type.

Software modules generally include instruction media storable within a memory location of a data-processing system and are typically composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or methods upon which the module is based. The term "module" as utilized herein can therefore generally refer to software modules or implementations thereof. Such modules can be utilized separately or together to form a program product that can be implemented through non-transitory signal-bearing media including transmission media and/or recordable media.

Figure 3:
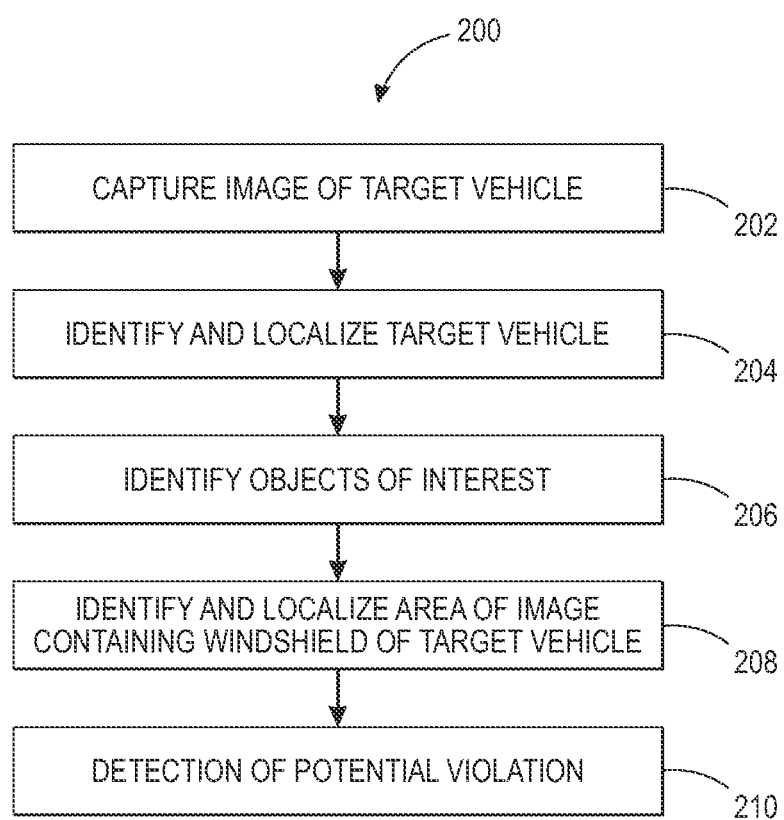
FIG. 3 illustrates a high level flow chart of an exemplary method of feature-based image analysis for localization of a windshield within an image.

FIG. 3 illustrates a high level flow chart of an exemplary method 200 of feature-based image analysis for localization of a windshield within an image. First, an image is captured of a target vehicle (Step 202). Then the target region is identified and localized within the captured image based on prior knowledge of geometric and spatial relationships between the target trigger device 110 and the image capture device 102, as well as information such as lane width, locations of lane markers, and other scenery elements that are likely to be consistent in captured images (Step 204). Localization generally refers to cropping an image to a region of interest, but may also encompass zooming in on a region of interest without altering the image itself. Objects of interest on the target vehicle are then identified within the target region (Step 206). Under near infrared illumination, reflective material such as those contained in headlights and license plates appear white (saturated) or very light (close to saturation) in a captured image, making it possible to differentiate these elements within the image by utilizing a predetermined threshold value (e.g., >250 for 8 bit images) or a predetermined percentage of high value pixels (e.g., top 20% of all pixels in the image) to detect those saturated pixels or pixels representing the objects of interest. Connected components analysis can then be utilized to group those pixels in order to identify objects of interest on the target vehicle based on shape and location. For example, a pair of round objects on each side of the image would be identified as headlights and a rectangle in the middle would be identified as a license plate. Objects of interest may also be identified utilizing a machine learning method, template matching, or some other correlation process. Based on a priori known average relative geometric relationships between the identified objects, the area of the image containing the windshield of the target vehicle is then identified and localized for downstream processing (Step 208). In one embodiment, downstream processing can include further analysis to detect vehicles in violation of HOV/HOT lane requirements or other violations, such as seat belt requirements (Step 210).

Figure 4A:
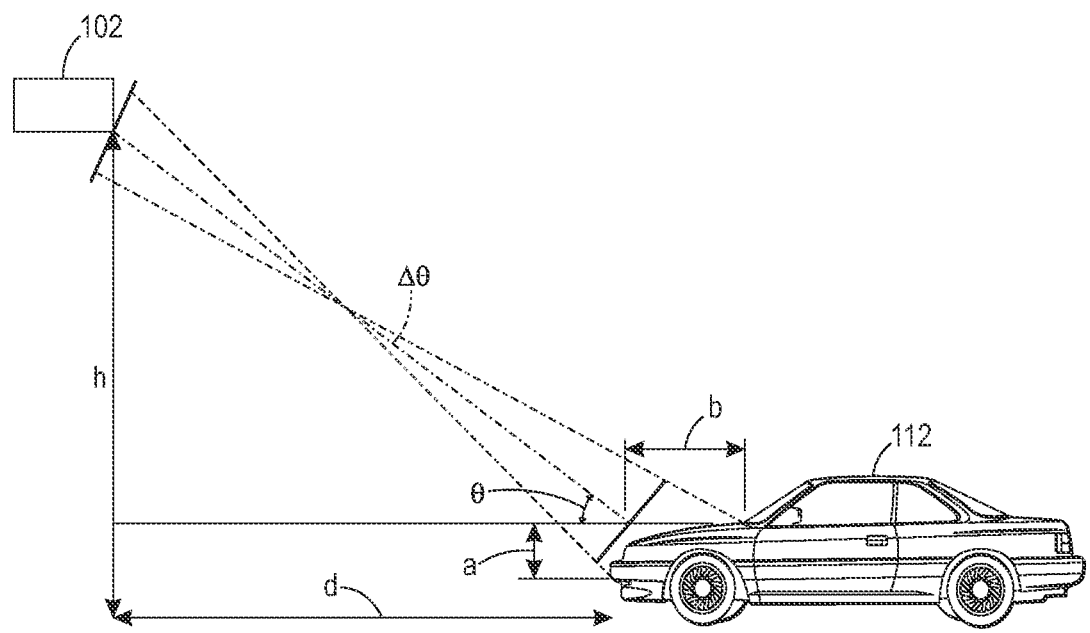
FIG. 4a shows the geometric relationship between the image capture device and a target vehicle.
Figure 4B:
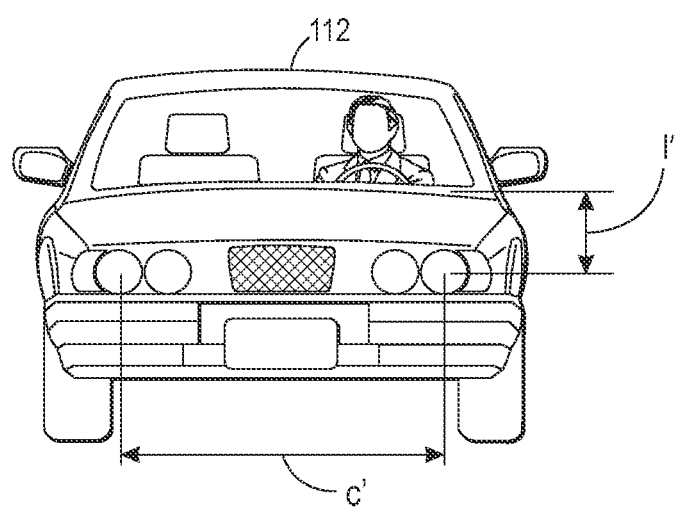
FIG. 4b illustrates the geometric relationships of exemplary objects of interest identified on a captured image of a target vehicle.

FIGS. 4a and 4b illustrate the relative geometric relationships between the objects of interest as well as possible known a priori information to be utilized in the identification of the area of an image containing the windshield of a target vehicle. FIG. 4a shows the geometric relationship between the image capture device 102 and a target vehicle 112, where a represents a real-world distance from a headlight forward most edge of the hood of the vehicle, b represents a real-world distance from the forward most edge of the hood to the bottom of the windshield, c (not shown) represents a real-world distance between the two headlights, d represents the real-world horizontal distance from the location of the image capture device 102 to the front of the target vehicle 112, and h represents a real-world height of the image capture device 102 above the roadway. Values for a, b and c can be determined, for example, from the average values of those dimensions for a set of target vehicles under consideration. Values for d, h, and θ are fixed by the camera and trigger device locations. The value of θ is given by $\tan^{-1}(h/d)$. FIG. 4b illustrates the geometric relationships of exemplary objects of interest identified on a captured image of a target vehicle 112 where c' represents the distance in image pixels between two headlights in a captured image and I' represents a vertical distance in image pixels between the headlights and the windshield in a captured image. Because values are known for c, c', a, b, and θ, I' can be estimated on an image-by-image basis utilizing the following:

$$I' \approx \frac{(a\cos\theta + b\sin\theta c')}{c}$$

In an alternate embodiment where an image capture device sensor 103 horizontal number of pixels H, image capture device sensor 103 horizontal physical dimension s, and the focal length f of the image capture device 102 are known, l' can be estimated utilizing:

$$l' \approx \frac{H a \cos\theta + b \sin\theta \cos\theta}{\alpha d} = \frac{fH a \cos^2\theta + b \sin\theta \cos\theta}{sd} \quad (5)$$

where $$\alpha \approx \frac{s}{f}. \quad (15)$$

Once l' is known, the region of the captured image containing the windshield can be cropped based on l' and the pixel locations of the headlights in the vertical and horizontal directions, or otherwise denoted, such that further processing of the image for traffic violations can be detected with greater efficiency and efficacy as compared with analysis of the entire, un-cropped image.

FIG. 5 illustrates resultant images from the feature-based image analysis method 200 and system 100. Image 302 is an image captured by the image capture device which may contain objects that are distracting for later image analysis, such as roadside grass or concrete dividers. Image 304 illustrates identification and localization of a target area as produced by Step 202. Under NIR, objects of interest are highly saturated and appear much brighter than their surroundings, as depicted in enhanced image 306. Images 308 and 310 depict identification and localization of the windshield as produced by Step 206.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A system configured to perform feature-based image analysis for localization of a windshield within an image comprising:
    an image capture device operably connected to a data processing device and a target trigger device, wherein said image capture device captures an image upon receiving notification from said target trigger device; and
    a processor-usable medium embodying computer code, said processor-usable medium being coupled to said data processing device, said computer program code comprising instructions executable by said processor and configured for: identifying at least one object of interest on a target vehicle within said image that is not a windshield;
    locating said at least one object of interest within said image; and
    identifying a windshield of said target vehicle within said image based on a location of said at least one object of interest and a relative geometric relationship between said identified at least one object of interest and said windshield by conversion of physical dimensions to pixel dimensions within said image utilizing one of:

$$l' \approx \frac{(a\cos\theta + b\sin\theta)c'}{c},$$

and $$l' \approx \frac{fH(a\cos^2\theta + b\sin\theta\cos\theta)}{sd},$$

where l' represents a vertical distance in image pixels between the headlights and the windshield in said captured image c' represents the distance in image pixels between two headlights in said captured image, a represents a real-world distance from a headlight to the forward most edge of a hood of said vehicle, b represents a real-world distance from the forward most edge of the hood to the bottom of the windshield, c represents a real-world distance between the two headlights, f represents the focal length of the image capture device, H represents a horizontal number of pixels of the image capture device, s represents the horizontal physical dimension of the image capture sensor, θ represents the elevation look down angle from the camera to the hood of the vehicle, and d represents the real-world horizontal distance from the location of the image capture device to the front of the target vehicle.

2. The system of claim 1 wherein said computer program code comprising instructions executable by said processor is further configured for:
    identifying a region containing said target vehicle within said image.

3. The system of claim 1 wherein identifying objects of interest on said target vehicle comprises analyzing said image for saturated pixels utilizing one of:
    a predetermined threshold value of saturation and a predetermined top percentage level of pixel values.

4. The system of claim 1 wherein said computer program code comprising instructions executable by said processor is further configured for:
    detecting violations of lane requirements in managed lanes.

5. A computer implemented method of feature-based image analysis for localization of a windshield within an image comprising:
    upon receipt of a notification from a target trigger device operably connected to an image capture device, capturing an image utilizing said image capture device;
    identifying a target vehicle within said image;
    identifying at least one object of interest on said target vehicle that is not a windshield;
    locating said at least one object of interest within said image; and
    identifying a windshield of said target vehicle within said image based on a location of said at least one object of interest, a relative physical geometric relationship between said identified at least one object of interest and said windshield, and a conversion of physical dimensions to pixel dimensions within said image utilizing one of:

$$l' \approx \frac{(a\cos\theta + b\sin\theta)c'}{c},$$

and $$l' \approx \frac{fH(a\cos^2\theta + b\sin\theta\cos\theta)}{sd},$$

where l' represents a vertical distance in image pixels between the headlights and the windshield in said captured image, c' represents the distance in image pixels between two headlights in said captured image, a represents a real-world distance from a headlight to the forward most edge of a hood of said vehicle, b represents a real-world distance from the forward most edge of the hood to the bottom of the windshield, c represents a real-world distance between the two headlights, f represents the focal length of the image capture device, H represents the horizontal number of pixels of the image capture device, s represents a horizontal physical dimension of the image capture sensor, θ represents the elevation look down angle from the camera to the hood of the vehicle, and d represents the real-world horizontal distance from the location of the image capture device to the front of the target vehicle.

6. The method of claim 5 further comprising localizing said target vehicle upon identification of said target vehicle.

7. The system of claim 5 wherein identifying objects of interest on said target vehicle comprises analyzing said image for saturated pixels utilizing one of:
   a predetermined threshold value of saturation, and
   a predetermined top percentage level of pixel values.

8. The method of claim 5 further comprising utilizing connected component analysis to identify objects of interest on said target vehicle.

9. The method of claim 5 wherein said objects of interest comprise headlights of said target vehicle.

10. The method of claim 5 further comprising detecting violations of lane requirements in managed lanes.

11. A non-transitory computer-usable medium for identifying a windshield within an image, said computer-usable medium embodying computer program code, said computer program code comprising computer executable instructions configured for:
   upon receipt of a notification from a target trigger device operably connected to an image capture device, capturing an image utilizing said image capture device;
   identifying a target vehicle within said image;
   identifying at least one object of interest on said target vehicle that is not the windshield; and
   identifying a windshield of said target vehicle based on a location of said at least one object of interest and a relative physical geometric relationship between said identified at least one object of interest and said windshield, and a conversion of physical dimensions to pixel dimensions within said image utilizing one of:

$$l' \approx \frac{(a\cos\theta + b\sin\theta)c'}{c},$$

and $$l' \approx \frac{fH(a\cos^2\theta + b\sin\theta\cos\theta)}{sd},$$

where l' represents a vertical distance in image pixels between the headlights and the windshield in said captured image, c' represents the distance in image pixels between two headlights in said captured image, a represents a real-world distance from a headlight to the forward most edge of a hood of said vehicle, b represents a real-world distance from the forward most edge of the hood to the bottom of the windshield, c represents a real-world distance between the two headlights, f represents the focal length of the image capture device, H represents a horizontal number of pixels of the image capture device, s represents the horizontal physical dimension of the image capture sensor, θ represents the elevation look down angle from the camera to the hood of the vehicle, and d represents the real-world horizontal distance from the location of the amage capture device to the front of the target vehicle.

12. The non-transitory computer-usable medium of claim 11 further comprising localizing an area of said image containing said windshield.

13. The non-transitory computer-usable medium of claim 11 wherein identifying objects of interest on said target vehicle comprises analyzing said image for saturated pixels utilizing one of:
   a predetermined threshold value of saturation, and
   a predetermined top percentage level of pixel values.

14. The non-transitory computer-usable medium of claim 11 further comprising utilizing connected component analysis to identify objects of interest on said target vehicle.

15. The non-transitory computer-usable medium of claim 11 wherein said objects of interest comprise headlights of said target vehicle.

16. The non-transitory computer-usable medium of claim 11 further comprising detecting violations of lane requirements in managed lanes.

* * * * *